(12) United States Patent
Oshima et al.

(10) Patent No.: US 6,940,534 B2
(45) Date of Patent: Sep. 6, 2005

(54) INTERMEDIATE TRANSFER RECORDING MEDIUM AND PROCESS FOR PRODUCING THE SAME

(75) Inventors: Katsuyuki Oshima, Shinjuku-ku (JP); Kozo Odamura, Shinjuku-ku (JP); Takayuki Imai, Shinjuku-ku (JP); Tadahiro Ishida, Shinjuku-ku (JP); Etsuo Takasaki, Shinjuku-ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 396 days.

(21) Appl. No.: 10/097,137

(22) Filed: Mar. 14, 2002

(65) Prior Publication Data

US 2004/0223044 A1 Nov. 11, 2004

(30) Foreign Application Priority Data

Mar. 16, 2001 (JP) ........................................ 2001-077085

(51) Int. Cl.⁷ ................................................. B41M 5/40

(52) U.S. Cl. ....................................................... 347/221

(58) Field of Search ................................ 347/217, 221, 347/213; 430/199–202

(56) References Cited

U.S. PATENT DOCUMENTS

| | | | | |
|---|---|---|---|---|
| 5,344,808 A | * | 9/1994 | Watanabe et al. | 503/227 |
| 6,284,708 B1 | * | 9/2001 | Oshima et al. | 503/227 |
| 6,482,489 B1 | * | 11/2002 | Otaki et al. | 428/40.1 |
| 6,531,024 B1 | * | 3/2003 | Braun | 156/277 |
| 2002/0061451 A1 | * | 5/2002 | Kita et al. | 430/2 |

* cited by examiner

Primary Examiner—Huan Tran
(74) Attorney, Agent, or Firm—Oliff & Berridge, PLC (57) ABSTRACT

The present invention relates to an intermediate transfer recording medium, that can yield thermally transferred images which are excellent in various fastness properties even under severe service conditions, can transfer a protective layer on an image with good accuracy in a simple manner, and can provide an object with an image formed thereon which is highly difficult to be altered or forged, a process for producing the same, and a method for image formation. The intermediate transfer recording medium comprises: a sheet substrate provided with a resin layer; and a transparent sheet provided with a receptive layer, said transparent sheet provided with the receptive layer having been stacked on the sheet substrate provided with the resin layer, the transparent sheet portion including the receptive layer having been half cut, a hologram formation layer being stacked on the transparent sheet, the resin layer being separable from the transparent sheet.

8 Claims, 3 Drawing Sheets

INTERMEDIATE TRANSFER RECORDING MEDIUM AND PROCESS FOR PRODUCING THE SAME

TECHNICAL FIELD

The present invention relates to an intermediate transfer recording medium, that can yield, on an object, thermally transferred images which are excellent in various fastness properties even under severe service conditions, can transfer a protective layer on the image with good accuracy in a simple manner, and can provide an object with an image formed thereon which is highly difficult to be altered or forged, a process for producing the same, and a method for image formation.

BACKGROUND OF THE INVENTION

Various thermal transfer methods have hitherto been known in the art. In these thermal transfer methods, a thermal transfer sheet comprising a color transfer layer provided on a substrate sheet is image-wise heated from its backside, for example, by means of a thermal head to thermally transfer the color transfer layer onto the surface of a thermal transfer image-receiving sheet, thereby forming an image. The thermal transfer methods are roughly classified according to the construction of the color transfer layer into two methods, i.e., sublimation dye thermal transfer (sublimation-type thermal transfer) and thermal ink transfer (hot melt-type thermal transfer). For both the methods, full-color images can be formed. For example, a thermal transfer sheet comprising layers of three colors of yellow, magenta, and cyan or optionally four colors of yellow, magenta, cyan, and black is provided, and images of the individual colors are thermally transferred in a superimposition manner on the surface of an identical thermal transfer image-receiving sheet to form a full-color image. The development of various hardwares and softwares associated with multimedia has led to the expansion of the market of the thermal transfer method as a full-color hard copy system for computer graphics, static images through satellite communication, digital images typified, for example, by images of CD-ROMs (compact disc read only memory), and analog images, such as video images.

Specific applications of the thermal transfer image-receiving sheet used in the thermal transfer method are various, and representative examples thereof include proofs of printing, output of images, output of plans and designs, for example, in CAD/CAM, output of various medical analytical instruments and measuring instruments, such as CT scans and endoscope cameras, alternative to instant photographs, output and printing of photograph-like images of a face or the like onto identification cards or ID cards, credit cards, and other cards, and composite photographs and commemorative photographs, for example, in amusement facilities, such as amusement parks, game centers (amusement arcades), museums, and aquaria. The diversification of the applications has lead to an increasing demand for the formation of a thermally transferred image on a desired object. One method proposed for meeting this demand comprises the steps: providing an intermediate transfer recording medium comprising a substrate and a receptive layer separably provided on the substrate; providing a thermal transfer sheet having a dye layer; transferring the dye from the thermal transfer sheet to the receptive layer in the intermediate transfer recording medium to form an image on the receptive layer; and then heating the intermediate transfer recording medium to transfer the receptive layer onto an object (see Japanese Patent Laid-Open No. 238791/1987).

Sublimation transfer-type thermal transfer sheets can faithfully form gradational images, such as photograph-like images of a face. Unlike conventional images produced by printing inks, however, these images disadvantageously lack in fastness properties, such as weathering resistance, abrasion resistance, and chemical resistance. To solve this problem, a method has been proposed wherein a protective layer thermal transfer film having a thermally transferable resin layer is put on top of a thermally transferred image and the transparent thermally transferable resin layer is transferred, for example, by means of a thermal head or heating roll to form a protective layer on the image and thus to protect the image.

The conventional transfer-type protective layer should be partially transferred at the time of transfer by means of a thermal head or a heat roll and thus should have good transferability. In this case, in order to realize good transferability of the protective layer, the protective layer should be a resin layer having a thickness of about several $\mu$m. This makes it impossible to impart fastness properties, such as high scratch resistance and chemical resistance, to the protective layer. Further, satisfactory fastness properties, such as scratch resistance and chemical resistance, cannot also be imparted to the protective layer formed on the intermediate transfer recording medium from the viewpoint of transferability. The formation of an image on an object using an intermediate transfer recording medium followed by lamination of a resin film to form a protective layer so as to cover the image on the object is also considered. For some shape of the object, however, the resin film is possibly cockled at the time of lamination, and the process is complicated, for example, due to the necessity of performing processing by means of a specialty machine such as a laminator.

Further, measures for preventing alteration and forgery of the object with an image formed thereon using the intermediate transfer recording medium are unsatisfactory, and, thus, the alteration and forgery cannot be fully prevented.

Accordingly, in order to solve the above problems of the prior art, an object of the present invention is to provide an intermediate transfer recording medium, that can yield thermally transferred images which are excellent in various fastness properties even under severe service conditions, can transfer a protective layer on the image with good accuracy in a simple manner, and can provide an object with an image formed thereon which is highly difficult to be altered or forged, a process for producing the same, and a method for image formation.

DISCLOSURE OF THE INVENTION

The above object of the present invention can be attained by an intermediate transfer recording medium comprising: a sheet substrate provided with a resin layer; and a transparent sheet provided with a receptive layer, said transparent sheet provided with the receptive layer having been stacked on the sheet substrate provided with the resin layer, the transparent sheet portion including the receptive layer having been half cut, the resin layer being separable from the transparent sheet, a hologram formation layer being provided on the transparent sheet.

Preferably, the whole portion except for the image forming portion has been separated and removed using the half cut as the boundary between the image forming portion remaining unremoved and the removal portion. This can realize the transfer of the patch portion in the image formation portion of the intermediate transfer recording medium in a simple manner with an accurate sharp edge.

Further, preferably, a patch portion as the image forming portion, which has been separated by the half cutting, has a size smaller than the object in its whole area on which an image is to be transferred. In this case, the patch portion does not project from the edge of the object.

The patch portion as the image forming portion, which has been separated by the half cutting, preferably has a partially removed portion relative to the object. According to this construction, a portion where the formation of no image as the patch portion is desired, such as a hologram portion or a logo portion in an object, for example, a sign panel, an IC chip, a magnetic stripe, or a credit card, can be registered with the partially removed portion followed by re-transfer of the patch onto the object.

Preferably, the total width of the intermediate transfer recording medium is larger than the width of the object in its face on which an image is to be transferred. According to this construction, when an image is formed on the receptive layer in the intermediate transfer recording medium and is then transferred onto an object, direct contact of a heating device, such as a thermal head, a press roll, or a press plate, with an object can be avoided, and, thus, damage to the object can be prevented.

Further, according to the present invention, there is provided a process for producing an intermediate transfer recording medium comprising: a sheet substrate provided with a resin layer; and a transparent sheet provided with a receptive layer, said transparent sheet provided with the receptive layer having been stacked on the sheet substrate provided with the resin layer, the transparent sheet portion including the receptive layer having been half cut, a hologram formation layer being provided on the transparent sheet, the resin layer being separable from the transparent sheet, said process comprising the steps of: providing an original sheet comprising a hologram formation layer formed on a transparent sheet; forming a receptive layer by coating on the original sheet; applying the transparent sheet on its side remote from the receptive layer onto a sheet substrate, in which a register mark has been previously provided at a predetermined position for each screen unit, through a resin layer; and then reading the register marks to perform registration for half cutting and then to perform half cutting.

Preferably, after the half cutting, the whole portion except for the image forming portion is separated and removed using the half cut as the boundary between the image forming portion remaining unremoved and the removal portion. This can realize the transfer of the patch portion in the image formation portion of the intermediate transfer recording medium in a simple manner with an accurate sharp edge.

Furthermore, according to the present invention, there is provided a method for image formation, comprising the steps of: providing any one of the above intermediate transfer recording media; forming a transfer image on the receptive layer; and then re-transferring only the portion with the image formed thereon onto an object to form an image on the object.

According to the present invention, the process for producing an intermediate transfer recording medium comprising a sheet substrate provided with a resin layer and a transparent sheet provided with a receptive layer, the transparent sheet provided with the receptive layer having been stacked on the sheet substrate provided with the resin layer, the transparent sheet portion including the receptive layer having been half cut, a hologram formation layer being stacked on the transparent sheet, the resin layer being separable from the transparent sheet, comprises the steps of: providing an original sheet comprising a hologram formation layer stacked on a transparent sheet; forming a receptive layer by coating on the original sheet; applying the transparent sheet on its side remote from the receptive layer onto a sheet substrate, in which a register mark has been previously provided at a predetermined position for each screen unit, through a resin layer; and then reading the register marks to perform registration for half cutting and then to perform half cutting.

Thermally transferred images formed using the intermediate transfer recording medium thus obtained have various excellent fastness properties even under severe service conditions, and, by virtue of the adoption of half cutting, the protective layer (transparent sheet) can be transferred onto the image with high accuracy in a simple manner. Further, since a hologram image is provided on the transparent sheet, the alteration and forgery of the object with a thermal transferred image provided thereon can be fully prevented.

BEST MODE FOR CARRYING OUT THE INVENTION

The present invention will be described in more detail with reference to the following preferred embodiments.

Figure 1:
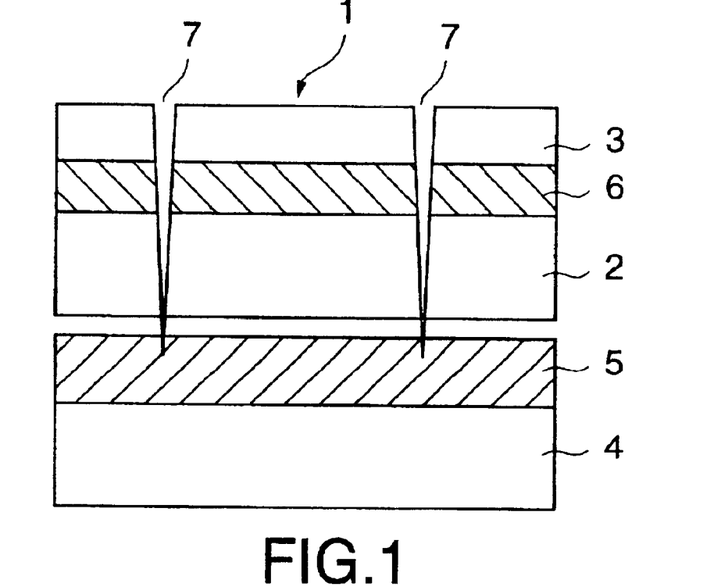
FIG. 1 is a schematic cross-sectional view showing one embodiment of the intermediate transfer recording medium according to the present invention.

FIG. 1 is a schematic cross-sectional view showing one embodiment of an intermediate transfer recording medium 1 according to the present invention. The intermediate transfer recording medium 1 comprises: a sheet substrate 4 having thereon a resin layer 5; and a transparent sheet 2 having thereon a hologram formation layer 6 and a receptive layer 3 in that order, the transparent sheet 2 provided with the hologram formation layer 6 and the receptive layer 3 having been stacked on the sheet substrate 4 provided with the resin layer 5 so that the resin layer 5 is separable from the transparent sheet 2, the transparent sheet portion 2 including the receptive layer 3 and the hologram formation layer 6 having been subjected to half cutting 7.

Figure 2:
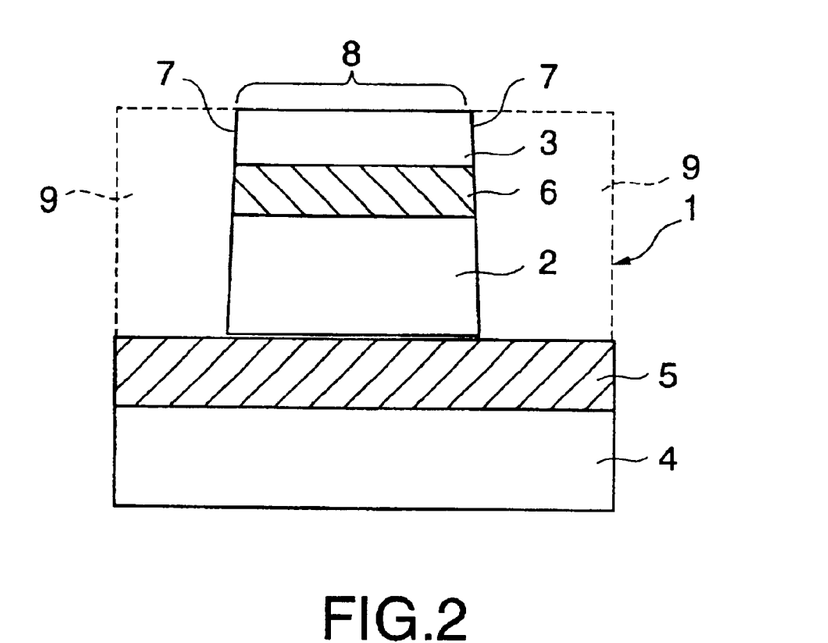
FIG. 2 is a schematic cross-sectional view showing another embodiment of the intermediate transfer recording medium according to the present invention.

FIG. 2 is a schematic cross-sectional view showing another embodiment of the intermediate transfer recording medium 1 according to the present invention. This intermediate transfer recording medium 1 comprises: a sheet substrate 4 having thereon a resin layer 5; and a transparent sheet 2 having thereon a hologram formation layer 6 and a receptive layer 3, the transparent sheet 2 provided with the hologram formation layer 6 and the receptive layer 3 having been stacked on the sheet substrate 4 provided with the resin layer 5 so that the resin layer 5 is separable from the transparent sheet 2, the transparent sheet portion 2 including the hologram formation layer 6 and the receptive layer 3 having been subjected to half cutting 7, the whole portion 9 except for the image forming portion 8 having been separated and removed using the half cut portion 7 as the boundary between the image forming portion 8 remaining unremoved and the removal region. In this embodiment, before the step of forming an image by thermal transfer and re-transferring the transfer portion onto an object, the step of separating and removing the portion 9 except for the image forming portion 8 using the half cut portion 7 as the boundary between the portion remaining unremoved and the removal portion is provided. In this case, when the transfer portion is re-transferred onto the object, only the image forming portion may be transferred. This can further simplify re-transfer onto the object.

Figure 4:
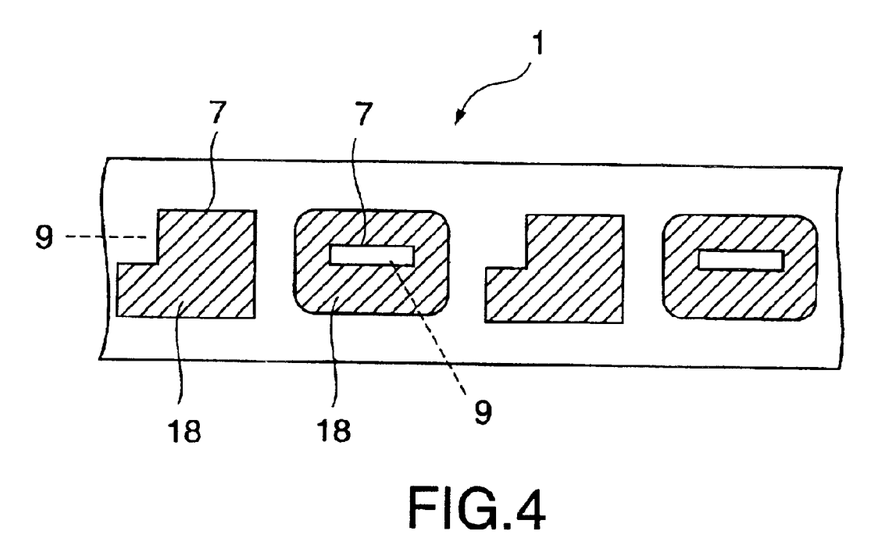
FIG. 4 is a schematic plan view showing a further embodiment of the intermediate transfer recording medium according to the present invention.

FIG. 4 is a schematic plan view showing a further embodiment of the intermediate transfer recording medium 1 according to the present invention. The intermediate transfer recording medium 1 comprises: a transparent sheet having thereon a hologram forming layer and a receptive layer in that order; and a sheet substrate, the transparent sheet having been separably stacked on the substrate sheet through a resin layer. The transparent sheet portion including the hologram formation layer and the receptive layer has been subjected to half cutting 7. A patch portion 18 as the image forming portion is left using the half cut portion 7 as the boundary between the removal portion and the image forming portion remaining unremoved, and, as shown in the drawing, the outside of the patch portion 18 and the inside removal portion surrounded by the patch portion 18 are separated and removed. Upon the re-transfer of this patch portion 18 onto an object, the patch portion 18 has a partially removed portion 9 relative to the object. In this case, a portion where the formation of no image as the patch portion is desired, such as a hologram portion or a logo portion in an object, for example, a sign panel, an IC chip, a magnetic stripe, or a credit card, is registered with the partially removed portion 9. By virtue of this, no image is present in a position where the formation of no image is contemplated. Thus, the occurrence of troubles can be prevented.

Transparent Sheet

In the transparent sheet 2 used in the intermediate transfer recording medium according to the present invention, the transparent sheet portion is cut using the half cut portion as the boundary between the removal portion and the portion remaining unremoved, and the transparent sheet can function as a protective layer in such a state that the transparent sheet covers the surface of the image formed portion. The transparent sheet may be any one so far as the sheet is transparent and has fastness properties, such as weathering resistance, abrasion resistance, and chemical resistance. Examples of transparent sheets usable herein include about 0.5 to 100 $\mu$m-thick, preferably about 10 to 40 $\mu$m-thick, films of polyethylene terephthalate, 1,4-polycyclohexylene dimethylene terephthalate, polyethylene naphthalate, polyphenylene sulfide, polystyrene, polypropylene, polysulfone, aramid, polycarbonate, polyvinyl alcohol, cellulose derivatives, such as cellophane and cellulose acetate, polyethylene, polyvinyl chloride, nylon, polyimide, and ionomer.

The transparent sheet in its side facing the resin layer may be subjected to release treatment to facilitate the separation of the transparent sheet from the resin layer. In the release treatment, a release layer is provided on the transparent sheet. The release layer may be formed by coating a coating liquid containing, for example, a wax, silicone wax, a silicone resin, a fluororesin, an acrylic resin, a polyvinyl alcohol resin, or a cellulose derivative resin or a copolymer of monomers constituting the above group of resins onto the transparent sheet by conventional means, such as gravure printing, screen printing, or reverse roll coating using a gravure plate, and drying the coating. The coverage of the release layer is about 0.1 to 10 g/m$^2$ on a dry basis.

Receptive Layer

The receptive layer 3 may be formed on the transparent sheet either directly or through a primer layer. The construction of the receptive layer 3 varies depending upon the recording system, that is, whether the recording system is hot-melt transfer recording or sublimation transfer recording. In the hot-melt transfer recording, a method may also be adopted wherein a color transfer layer is thermally transferred from the thermal transfer sheet directly onto the transparent sheet without providing the receptive layer. In the hot-melt transfer recording and the sublimation transfer recording, the receptive layer functions to receive a colorant thermally transferred from the thermal transfer sheet. In particular, in the case of the sublimable dye, preferably, the receptive layer receives the dye, develops a color, and, at the same time, does not permit re-sublimation of the once received dye. A transfer image is formed on a receptive layer in an intermediate transfer recording medium, and only the image formed portion is re-transferred onto an object to form an image on the object. The receptive layer according to the present invention is generally transparent so that an image transferred onto the object can be clearly viewed from the top. However, it is also possible to intentionally make the receptive layer opaque or to intentionally lightly color the receptive layer to render the re-transferred image distinct.

The receptive layer is generally composed mainly of a thermoplastic resin. Examples of materials usable for forming the receptive layer include: polyolefin resins such as polypropylene; halogenated polymers such as vinyl chloride-vinyl acetate copolymer, ethylene-vinyl acetate copolymer, and polyvinylidene chloride; polyester resins such as polyvinyl acetate and polyacrylic esters; polystyrene resins; polyamide resins; copolymer resins produced from olefins, such as ethylene and propylene, and other vinyl monomers; ionomers; cellulosic resins such as cellulose diacetate; and polycarbonate resins. Among them, polyester resins and vinyl chloride-vinyl acetate copolymer and mixtures of these resins are particularly preferred.

In sublimation transfer recording, a release agent may be incorporated into the receptive layer, for example, from the viewpoint of preventing fusing between the thermal transfer sheet having a color transfer layer and the receptive layer in the intermediate transfer recording medium at the time of image formation or preventing a lowering in sensitivity in printing and the like. Preferred release agents usable as a mixture include silicone oils, phosphoric ester surfactants, and fluorosurfactants. Among them, silicone oils are preferred. Preferred silicone oils include epoxy-modified, vinyl-modified, alkyl-modified, amino-modified, carboxyl-modified, alcohol-modified, fluorine-modified, alkyl aralkyl polyether-modified, epoxy-polyether-modified, polyether-modified and other modified silicone oils.

A single or plurality of release agents may be used. The amount of the release agent added is preferably 0.5 to 30 parts by weight based on 100 parts by weight of the resin for the receptive layer. When the amount of the release agent added is outside the above amount range, problems sometimes occur such as fusing between the sublimation-type thermal transfer sheet and the receptive layer in the intermediate transfer recording medium or a lowering in sensitivity in printing. The addition of the release agent to the receptive layer permits the release agent to bleed out on the surface of the receptive layer after the transfer to form a release layer. Alternatively, these release agents may be separately coated onto the receptive layer without being incorporated into the receptive layer. The receptive layer may be formed by coating a solution of a mixture of the above resin with a necessary additive, such as a release agent, in a suitable organic solvent, or a dispersion of the mixture in an organic solvent or water onto a transparent sheet by conventional forming means such as gravure coating, gravure reverse coating, or roll coating, and drying the coating. The receptive layer may be formed at any coverage. In general, however, the coverage of the receptive layer is 1 to 50 g/m$^2$ on a dry basis. The receptive layer is preferably in the form of a continuous coating. However, the receptive layer may be in the form of a discontinuous coating formed using a resin emulsion, a water-soluble resin, or a resin dispersion. Further, an antistatic agent may be coated onto the receptive layer from the viewpoint of realizing stable carrying of sheets through a thermal transfer printer.

(Sheet Substrate)

The sheet substrate 4 used in the present invention is not particularly limited, and examples thereof include: various types of paper, for example, capacitor paper, glassine paper, parchment paper, or paper having a high sizing degree, synthetic paper (such as polyolefin synthetic paper and polystyrene synthetic paper), cellulose fiber paper, such as wood free paper, art paper, coated paper, cast coated paper, wall paper, backing paper, synthetic resin- or emulsion-impregnated paper, synthetic rubber latex-impregnated paper, paper with synthetic resin internally added thereto, and paperboard; and films of polyester, polyacrylate, polycarbonate, polyurethane, polyimide, polyether imide, cellulose derivative, polyethylene, ethylene-vinyl acetate copolymer, polypropylene, polystyrene, acrylic resin, polyvinyl chloride, polyvinylidene chloride, polyvinyl alcohol, polyvinyl butyral, nylon, polyether ether ketone, polysulfone, polyether sulfone, tetrafluoroethylene-perfluoroalkyl vinyl ether, polyvinyl fluoride, tetrafluoroethylene-ethylene, tetrafluoroethylene-hexafluoropropylene, polychlorotri-fluoroethylene, polyvinylidene fluoride and the like.

The thickness of the sheet substrate is preferably 10 to 100 μm. When the sheet substrate is excessively thin, the resultant intermediate transfer recording medium is not sturdy and thus cannot be carried by means of a thermal transfer printer or is disadvantageously curled or cockled. On the other hand, when the sheet substrate is excessively thick, the resultant intermediate transfer recording medium is excessively thick. In this case, the driving force of the thermal transfer printer necessary for carrying the intermediate transfer recording medium is excessively large, resulting in a printer trouble or a failure of the intermediate transfer recording medium to be normally carried.

(Resin Layer)

The resin layer 5 may be provided as a pressure-sensitive adhesive layer, an easy-adhesion adhesive layer, or an extrusion coating (EC) on the sheet substrate. The pressure-sensitive adhesive layer may be formed of a conventional solvent-type or aqueous pressure-sensitive adhesive. Pressure-sensitive adhesives include, for example, vinyl acetate resins, acrylic resins, vinyl acetate-acryl copolymers, vinyl acetate-vinyl chloride copolymers, ethylene-vinyl acetate copolymers, polyurethane resins, natural rubbers, chloroprene rubbers, and nitrile rubbers. The coverage of the pressure-sensitive adhesive layer is generally about 8 to 30 g/m$^2$ on a solid basis, and the pressure-sensitive adhesive layer may be formed by coating the pressure-sensitive adhesive by a conventional method, for example, gravure coating, gravure reverse coating, roll coating, Komma coating, or die coating, on a release sheet and drying the coating. The adhesive strength of the pressure-sensitive adhesive layer is preferably approximately in the range of 5 to 1,000 g, in terms of peel strength between the transparent sheet and the pressure-sensitive adhesive layer, as measured by a 180-degree peel method according to JIS Z 0237. In the formation of the pressure-sensitive adhesive layer on the sheet substrate, the above-described type of pressure-sensitive adhesive and coverage adopted are preferably selected so that the peel strength is in the above-defined range. When the pressure-sensitive adhesive layer is provided on the sheet substrate and the transparent sheet is stacked onto the pressure-sensitive adhesive layer, a method may be adopted such as dry lamination or hot-melt lamination of the pressure-sensitive adhesive layer.

In the formation of the easy-adhesion adhesive layer, preferably, a latex of styrene-butadiene copolymer rubber (SBR), an acrylic resin, such as acrylonitrile-butadiene copolymer rubber (NBR) or a polyacrylic ester, a rubbery resin, a wax, or a mixture of two or more of the above materials is coated onto a sheet substrate by a conventional coating method, and the easy-adhesion adhesive layer is then stacked onto the transparent sheet by dry lamination with heating. The easy-adhesion adhesive layer after the separation of the transparent sheet from the sheet substrate has lowered tackiness and no longer can be used in the application of the transparent sheet to the sheet substrate. When this easy-adhesion adhesive layer is used, a primer layer may be provided between the sheet substrate and the easy-adhesion adhesive layer.

Further, an EC layer may be provided as the resin layer according to the present invention on the sheet substrate. The thermoplastic resin used for forming the EC layer is not particularly limited so far as the resin is not virtually adhered to the transparent sheet and is extrudable. In particular, however, a polyolefin resin is preferred which is not virtually adhered to PET films generally utilized in the transparent sheet and has excellent processability. More specifically, for example, LDPE, MDPE, HDPE, and PP resins are usable. In extrusion coating these resins, when a matte roll is used as a cooling roll, the matte face may be transferred onto the surface of the EC layer, whereby fine concaves and convexes can be formed to render the EC layer opaque. Alternatively, a method may be used wherein a white pigment, such as calcium carbonate or titanium oxide, is mixed into the polyolefin resin to form an opaque EC layer. The EC layer may be either a single-layer structure or a multi-layer structure of two or more layers. The peel strength of the EC layer from the transparent sheet may be regulated according to the processing temperature in the extrusion and the type of the resin. Thus, simultaneously with the extrusion of the EC layer on the sheet substrate, the sheet substrate can be stacked onto the transparent sheet through the EC layer by the so-called "EC lamination."

In providing the resin layer on the sheet substrate, a primer layer may be provided on the surface of the sheet substrate to improve the adhesion between the sheet substrate and the resin layer. Instead of the provision of the primer layer, the surface of the sheet substrate may be subjected to corona discharge treatment. The primer layer may be formed by providing a coating liquid in the form of a solution or dispersion of a polyester resin, a polyacrylic ester resin, a polyvinyl acetate resin, a polyurethane resin, a polyamide resin, a polyethylene resin, a polypropylene resin or the like in a solvent and coating the coating liquid by the same means as used in the formation of the receptive layer. The thickness of the primer layer is about 0.1 to 5 g/m² on a dry basis. The primer layer may also be formed between the transparent sheet and the receptive layer in the same manner as described above.

In the intermediate transfer recording medium according to the present invention, if necessary, a heat-resistant slip layer may be provided on the backside of the sheet substrate, that is, on the sheet substrate in its side remote from the resin layer, from the viewpoint of preventing adverse effect, such as sticking, caused by heat of a thermal head, a heat roll or the like as means for re-transferring the image formed portion onto an object, or cockling.

Any conventional resin may be used as the resin for constituting the heat-resistant slip layer, and examples thereof include polyvinyl butyral resins, polyvinyl acetoacetal resins, polyester resins, vinyl chloride-vinyl acetate copolymers, polyether resins, polybutadiene resins, styrene-butadiene copolymers, acrylic polyols, polyurethane acrylates, polyester acrylates, polyether acrylates, epoxy acrylates, prepolymers of urethane or epoxy, nitrocellulose resins, cellulose nitrate resins, cellulose acetopropionate resins, cellulose acetate butyrate resins, cellulose acetate hydrogen phthalate resins, cellulose acetate resins, aromatic polyamide resins, polyimide resins, polycarbonate resins, chlorinated polyolefin resins, and chlorinated polyolefin resins.

Slipperiness-imparting agents added to or topcoated on the heat-resistant slip layer formed of the above resin include phosphoric esters, silicone oils, graphite powder, silicone graft polymers, fluoro graft polymers, acrylsilicone graft polymers, acrylsiloxanes, arylsiloxanes, and other silicone polymers. Preferred is a layer formed of a polyol, for example, a high-molecular weight polyalochol compound, a polyisocyanate compound and a phosphoric ester compound. Further, the addition of a filler is more preferred.

The heat-resistant slip layer may be formed by dissolving or dispersing the resin, the slipperiness-imparting agent, and a filler in a suitable solvent to prepare an ink for the formation of a heat-resistant slip layer, coating the ink onto the backside of the substrate sheet by forming means, such as gravure printing, screen printing, or reverse coating using a gravure plate, and drying the coating.

(Hologram Formation Layer)

The hologram formation layer 6 provided on the transparent sheet in the intermediate transfer recording medium according to the present invention is generally formed as a resin layer. This layer per se may have a single-layer structure or a multi-layer structure. Various hologram images (patterns) are formed in the resin layer.

The size and the form of the hologram image (pattern) vary depending upon the form of required prints and are not particularly limited. The hologram image may be formed by a conventional method, for example, by providing an original plate having a concave-convex pattern of interference fringes of the hologram and forming fine concaves and convexes, for example, by embossing.

According to the present invention, by virtue of the provision of this hologram formation layer, in the resultant object with an image thermally transferred thereon from the intermediate transfer recording medium, alternation and forgery can be fully prevented.

The hologram image provided in the hologram formation layer may be either a plane hologram or a volume hologram. In the plane hologram, among others, a relief hologram is preferred from the viewpoints of mass productivity and cost. Other holograms usable herein include Fresnel holograms, Fraunhofer holograms, lensless Fourier transformation holograms, image holograms and other holograms reproducible by laser, rainbow holograms and other holograms reproducible by white light, and holograms utilizing the above principles, for example, color holograms, computer holograms, hologram displays, multiplex holograms, holographic stereograms, and holographic diffraction gratings.

Photosensitive materials in the hologram formation layer for recording interference fringes include silver salts, gelatin bichromate, thermoplastics, diazo photosensitive material photoresists, ferroelectrics, photochromic materials, and chalcogen glasses. Materials for the hologram layer include: thermoplastic resins, such as polyvinyl chloride, acrylic resins (for example, polymethyl methacrylate), polystyrene, and polycarbonate; cured products of thermosetting resins, such as unsaturated polyesters, melamine, epoxy, polyester (meth)acrylate, urethane (meth)acrylate, epoxy (meth) acrylate, polyether (meth)acrylate, polyol (meth)acrylate, melamine (meth)acrylate, and triazine acrylate; cured products of ultraviolet-curable resins, for example, a composition comprising a suitable mixture of an unsaturated ethylene monomer with an unsaturated ethylene oligomer and, added thereto, a sensitizer; mixtures of thermoplastic resins with thermosetting resins; and thermoformable materials containing a radically polymerizable unsaturated group. In particular, thermosetting resins and ultraviolet-curable resins having excellent fastness properties, such as chemical resistance, lightfastness and weathering resistance, are preferred as the resin for forming the hologram formation layer.

The intermediate transfer recording medium according to the present invention comprises at least a receptive layer, a transparent sheet, a hologram formation layer, a resin layer, and a sheet substrate. An antistatic layer may be provided on the surface of the receptive layer, the backside of the sheet substrate, or the outermost surface of both sides. The antistatic layer may be formed by coating a solution or dispersion of an antistatic agent, such as a fatty ester, a sulfuric ester, a phosphoric ester, an amide, a quaternary ammonium salt, a betaine, an amino acid, an acrylic resin, or an ethylene oxide adduct, in a solvent. The forming means used may be the same as that used in the formation of the receptive layer. The coverage of the antistatic layer is preferably 0.001 to 0.1 g/m² on a dry basis.

An intermediate layer formed of one of various resins may be provided between the substrate and the receptive layer in the transparent sheet. In this case, the intermediate layer is preferably transparent so that the re-transferred image can be viewed. When the intermediate layer has various functions, excellent functions can be imparted to the image-receiving sheet. For example, a highly elastically deformable or plastically deformable resin, for example, a polyolefin resin, a vinyl copolymer resin, a polyurethane resin, or a polyamide resin, may be used as a cushioning property-imparting resin to improve the sensitivity in printing of the image-receiving sheet or to prevent harshness of images. Antistatic properties may be imparted to the intermediate layer by adding the antistatic agent to the cushioning property-imparting resin, dissolving or dispersing the mixture in a solvent, and coating the solution or dispersion to form an intermediate layer.

(Half Cutting)

In the intermediate transfer recording medium according to the present invention, the transparent sheet portion including the receptive layer and the hologram formation layer has been subjected to half cutting 7. The half cut may be formed by any method without particular limitation so far as half cutting is possible. Examples of methods usable for half cutting include a method wherein the intermediate transfer recording medium is inserted into between an upper die provided with a cutter blade and a pedestal and the upper die is then vertically moved, a method wherein a cylinder-type rotary cutter is used, and a method wherein heat treatment is carried out by means of a laser beam. As shown in FIG. 2, the portion 9 except for the image forming portion 8 is previously separated using the half cut portion 7 as the boundary between the portion remaining unremoved and the removal portion, and, at the time of image formation, the receptive layer 3 provided on the transparent sheet 2 is left only in the image forming portion 8. The removal of refuse in this way can eliminate a fear of the transparent sheet portion being cut by the half cut portion at the time of the re-transfer of the image onto the object. Thus, the image formed portion can be surely transferred onto the object.

Regarding the half cut portion 7, it is common practice to continuously provide a cut, one round by one round, around the image forming portion. In this case, an uncut (no cut) portion may be partially provided, for example, at four corners, to prevent the a trouble of separation of the half cut portion during handling, for example, during carriage through a thermal transfer printer. However, it should be noted that, in order that, at the time of the re-transfer of the image formed portion onto the object, the uncut portion is melt cut and the portion surrounded by the continuous half cut portion including the melt cut portion is transferred onto the object, the length of the uncut is preferably small and about 0.1 to 0.5 mm. Alternatively, perforation, such that half cuts and uncuts are alternately provided, may be provided. In the case of the perforation, for example, preferably, the length of the cut portion is about 2 to 5 mm, and the length of the uncut portion is about 0.1 to 0.5 mm. Examples of methods usable for the formation of the perforation include a method wherein the intermediate transfer recording medium is inserted into between an upper die provided with a perforating blade and a pedestal and the upper die is then vertically moved and a method wherein a cylinder-type rotary cutter is used.

At the time of half cutting, when the depth of the cut portion is excessively large in the depth direction, that is, when not only the transparent sheet portion but also the sheet substrate is cut, the intermediate transfer recording medium is cut at the half cut portion during carriage in the printer, often leading to carriage troubles. On the other hand, at the time of half cutting, when the cut level is excessively low in the depth direction, for example, when a half cut is provided only in the receptive layer without the provision of a half cut in the transparent sheet, the resin layer and the transparent sheet cannot be separated from each other at the time of the re-transfer of the image-formed portion onto an object. Therefore, as shown in FIG. 1, the depth of the half cutting is preferably on a level such that passes through the receptive layer, the hologram formation layer, and the transparent sheet and slightly bites the resin layer in the thicknesswise direction. Preferably, the half cutting according to the present invention is previously carried out before the formation of an image on the receptive layer in the intermediate transfer recording medium. However, alternatively, the half cutting may be carried out according to the image region after the formation of an image on the receptive layer in the intermediate transfer recording medium.

(Production Process of Intermediate Transfer Recording Medium)

According to the present invention, there is provided a process for producing an intermediate transfer recording medium comprising a sheet substrate provided with a resin layer and a transparent sheet provided with a receptive layer, the transparent sheet provided with the receptive layer having been stacked on the sheet substrate provided with the resin layer so that the resin layer faces the transparent sheet on its side remote from the receptive layer, the transparent sheet portion including the receptive layer having been half cut, a hologram formation layer being stacked on the transparent sheet, the resin layer being separable from the transparent sheet, said process comprising the steps of: providing an original sheet comprising a hologram formation layer stacked on a transparent sheet; forming a receptive layer by coating on the original sheet; applying the transparent sheet on its side remote from the receptive layer onto a sheet substrate, in which a register mark has been previously provided at a predetermined position for each one screen unit, through a resin layer; and then reading the register marks to perform registration for half cutting and then to perform half cutting.

An embodiment of the production process of an intermediate transfer recording medium will be described with reference to FIG. 3.

Figure 3A:
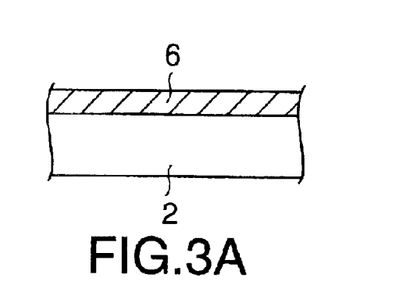
FIGS. 3A, 3B, 3C, 3D, and 3E are schematic views illustrating an embodiment of the process for producing an intermediate transfer recording medium according to the present invention.
Figure 3B:
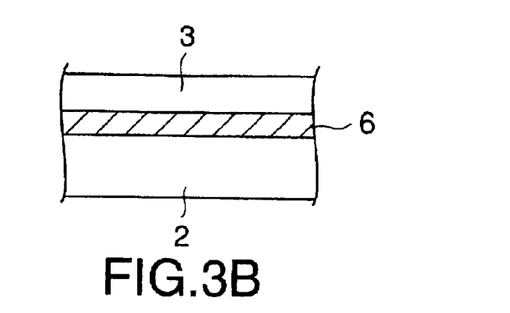

As shown in FIG. 3A, an original sheet composed of a transparent sheet 2 and a hologram formation layer 6 stacked onto the transparent sheet 2 is provided. Next, as shown in FIG. 3B, a receptive layer 3 is formed on the hologram formation layer 6 in the original sheet by coating and drying by a conventional method as described above in connection with the intermediate transfer recording medium.

Figure 3C:
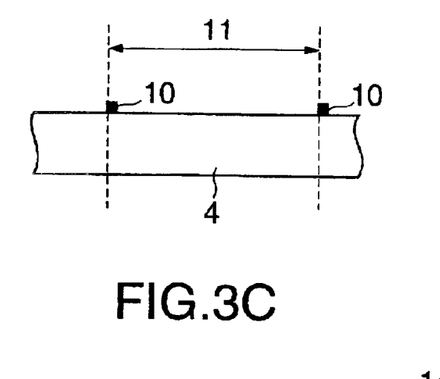

As shown in FIG. 3C, register marks 10 are repeatedly provided on a sheet substrate 4 for each screen 11. The register marks 10 may be formed by any method, and examples of methods usable herein include gravure printing or offset printing, the provision of a deposit film by hot stamping using a transfer foil, the application of a deposit film provided with a pressure-sensitive adhesive on the backside of the sheet substrate, and the provision of through holes which extend from the surface to the backside of the sheet substrate 4. In this case, the register marks 10 are provided while leaving a space for each screen 11.

For example, the shape or the color of the register mark is not limited so far as the register mark is detectable with a detector. Examples of shapes of the register mark include quadrangle, circle, bar cord, and line extending from end to end in the widthwise direction of the intermediate transfer recording medium. The color of the register mark may be any one detectable with a detector. For example, when a light transmission detector is used, silver, black and other colors having a high level of opaqueness may be mentioned as the color of the register mark. On the other hand, when a light reflection detector is used, for example, a highly light reflective metalescent color may be mentioned as the color of the register mark.

A hologram mark (a mark having a hologram pattern) may be used as the register mark. The hologram mark may be formed by any conventional method for the formation of a hologram pattern, for example, by providing an original plate having a concave-convex pattern of interference fringes of a hologram and forming fine concaves and convexes by embossing. The so-called "hologram sensor" may be utilized as a sensor for the hologram mark. In this sensor, light emitted from a light emitting device is irregularly reflected from the hologram mark and emits diffracted light which can be then detected with a photodetector to detect the position of the hologram mark.

The position of the register mark is not limited to the position shown in the drawing. For example, when the sheet substrate is transparent, the register mark may be provided on the sheet substrate in its side remote from the side on which the resin layer is to be formed.

Figure 3D:
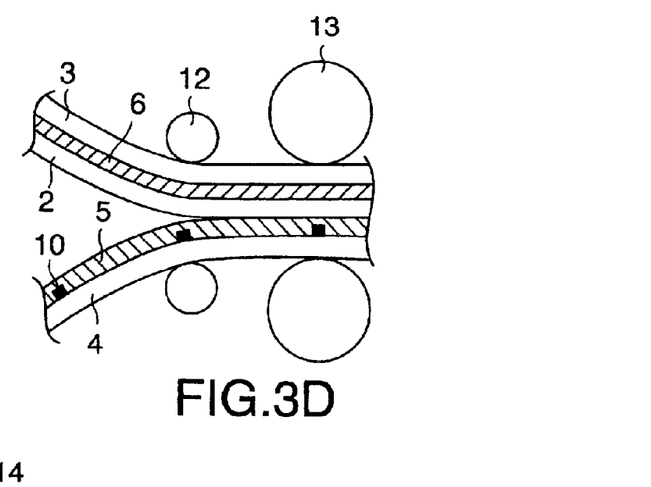

As shown in FIG. 3D, the assembly comprising the hologram formation layer 6 and the receptive layer 3 provided on the transparent sheet 2 as described above in conjunction with FIG. 3B is laminated onto the sheet substrate 4 provided with the register mark 10 as described above in conjunction with FIG. 3C through a resin layer 5 so that the transparent sheet 2 on its side remote from the receptive layer 3 faces the sheet substrate 4 on its register mark 10 side.

In this lamination, the transparent sheet 2 side and the sheet substrate 4 side are guided by means of guide rolls 12 and are put on top of each other. In this case, a resin layer 5 is previously formed by coating on the sheet substrate by a conventional method although this is not shown in the drawing.

In this way, the transparent sheet 2 side and the sheet substrate 4 side are put on top of each other through the resin layer 5, and both the assemblies are pressed by laminate rolls 13 optionally with heating and are consequently laminated to form an integral structure.

The resin layer may be in the form of a pressure-sensitive adhesive layer, an easy-adhesion adhesive layer, or an extrusion coating (EC), and lamination methods, such as dry lamination, hot-melt lamination, and EC lamination, may be used according to the form of the resin layer.

In the embodiment shown in FIG. 3D, the resin layer 5 is coated onto the sheet substrate 4, and the transparent sheet 2 side and the sheet substrate 4 side are laminated onto each other through the resin layer 5. Alternatively, a method may also be used wherein the resin layer is coated on the transparent sheet side and the transparent sheet side and the sheet substrate side are laminated onto each other through the resin layer.

As shown in the drawing, in a construction such that the register mark 10 comes into direct contact with the resin layer 5, for example, when an aqueous solvent is used in the coating liquid for the resin layer, it is important that a solvent, such as toluene or methyl ethyl ketone, be used in the coating liquid for the register mark from the viewpoint of rendering the register mark and the resin layer incompatible with each other at the time of the lamination of the sheet substrate and the transparent sheet through the resin layer. The reason for this is as follows. When the register mark is incompatible with the layer in contact with the register mark, adverse effect on the register mark print, such as bleeding of the register mark or trapping, can be avoided.

Figure 3E:
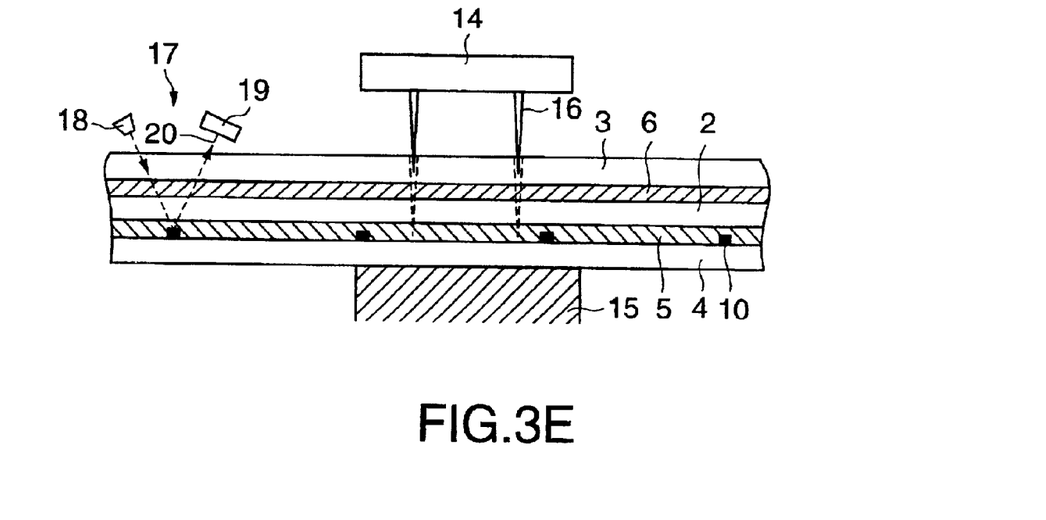

As shown in FIG. 3E, the intermediate transfer recording medium 1 produced by providing the hologram formation layer 6 and the receptive layer 3 on the transparent sheet 2 and laminating the transparent sheet 2 on its side remote from the receptive layer 3 onto the sheet substrate 4, provided with the register mark 10, through the resin layer 5, is subjected to half cutting using an upper die 14, provided with a half cutting blade 16 having predetermined size and pattern, and a pedestal 15.

Specifically, the intermediate transfer recording medium 1 is placed between the upper die 14, provided with the cutter blade 16, and the pedestal 15, and the upper die 14 is pressed toward the pedestal 15 to perform half cutting 7 in the intermediate transfer recording medium 1.

This half cutting should be carried out at predetermined positions in the intermediate transfer recording medium 1. To this end, the register mark 10 provided in the intermediate transfer recording medium is read by a specialty detector 14 for register mark reading, and, in synchronization with the read signal, the upper die 14 provided with the cutter blade 16 is dropped toward the pedestal 15. The registration for half cutting 7 is then carried out followed by half cutting 7.

Regarding the detector 17 shown in the drawing, light emitted from a light emitting device 18 is reflected from the register mark 10 provided in the intermediate transfer recording medium 1, and the reflected light 20 is detected with a photodetector 19 to detect the position of the register mark 10. In this embodiment, the register mark is detected with a light reflection sensor. The detection method, however, is not limited to this only. Specifically, a transmission sensor may also be utilized wherein a light emitting device provided on one side of the intermediate transfer recording medium emits light toward the register mark, and the transmitted light is detected with a photodetector provided on the other side of the intermediate transfer recording medium.

As described above, after the half cutting, the portion except for the image forming portion is preferably separated and removed using the half cut portion as the boundary between the portion remaining unremoved and the removal portion from the viewpoint of production. This permits the patch portion (the portion separated by the half cutting) of the image forming portion of the intermediate transfer recording medium to be easily transferred in a sharp and accurate edge shape onto an object.

In the transfer of the patch portion onto the object, the area of the patch portion is smaller than or equal to the total transfer area of the object. In order to avoid an unfavorable phenomenon such that the end of the patch portion is transferred onto the object and is projected from the object to a noticeable extent, the patch portion as the image forming portion is preferably smaller than the total transfer area of the object by one to several dots or by about 0.5 to 2 mm in terms of the end portion length.

In connection with the size of the transfer face, the total width of the intermediate transfer recording medium is preferably larger than the width of the transfer face of the object. In this case, when an image is formed on the receptive layer of the intermediate transfer recording medium followed by the transfer of the image formed portion onto the object, the object does not come into direct contact with a heating device, such as a thermal head, a press roll, or a press plate. Therefore, damage to the object can be prevented.

In reading the register mark to perform the registration for half cutting in the intermediate transfer recording medium and to perform half cutting, care should be taken so that the hologram image provided in the hologram formation layer of the intermediate transfer recording medium is not cut at the half cut portion. In order to avoid this unfavorable phenomenon, the use of the following method is preferred. A part of the hologram image provided in the hologram formation layer is read as a detection mark. Alternatively, a hologram detection mark is provided, and the detection mark is read. This reading is synchronized with the reading of the register mark to regulate the position of half cutting and the position of hologram image. When the hologram detection mark is used, a hologram detection sensor should be provided.

(Method for Image Formation)

The method for image formation according to the present invention comprises the steps of: providing the above intermediate transfer recording medium; transferring an image onto the receptive layer in the intermediate transfer recording medium to form an image on the receptive layer; and re-transferring only the image formed portion onto an object to form an image on the object.

In the thermal transfer recording method for forming an image on the receptive layer, thermal energy controlled by an image signal is generated by means of a thermal head and is used as activation energy of a recoding material such as ink. In this method, a thermal transfer sheet comprising a thermally transferable colorant layer provided on a substrate sheet is put on top of recording paper. The assembly is passed through between a thermal head and a platen under suitable pressure, and the recording material is activated by the thermal head at a temperature increased by energization and is transferred onto the recording paper with the aid of pressure of the platen.

The transfer recording method is classified into sublimation dye thermal transfer (sublimation-type thermal transfer) and thermal ink transfer (hot melt-type thermal transfer). Both the types can be used in the formation of an image on an object according to the present invention. Further, the sublimation dye thermal transfer may be used in combination with the thermal ink transfer. In this case, for example, a halftone image may be formed by the sublimation dye thermal transfer recording while forming character images by the thermal ink transfer recording.

The thermal transfer recording can be carried out by the thermal head, as well as by thermal transfer means utilizing laser beam irradiation heating.

According to the present invention, examples of means usable for re-transferring the image formed portion onto an object include: one wherein the object and the intermediate transfer recording medium with an image formed thereon are sandwiched between a thermal head and a platen and the assembly is heated by the thermal head; one wherein a heat roll system is used (a commercially available laminator is in many cases of this type wherein hot pressing is carried out by a pair of heat rolls); one wherein the object and the intermediate transfer recording medium are sandwiched between a heated flat plate and a flat plate or between a heated flat plate and a roll followed by hot pressing; and one wherein thermal transfer is carried out by heating utilizing laser beam irradiation.

When the thermal head is used as means for re-transferring the image onto the object, the thermal head may be the same as used in the image formation, or alternatively, may be different from the thermal head used in the image formation. In the method for image formation according to the present invention, however, the thermal transfer means for image formation and the means for the re-transfer of the image onto the object are preferably carried out on an in-line basis by means of one thermal transfer printer from the viewpoint of efficiency.

EXAMPLES

The following examples further illustrate the present invention. In the following description, "parts" or "%" is by weight unless otherwise specified.

Example 1

The following coating liquid for a hologram layer was first coated on a 25 μm-thick polyethylene terephthalate film (Lumirror, manufactured by Toray Industries, Inc.) as a transparent sheet, and the coating was dried to form a hologram layer at a coverage of 2.0 g/m$^2$ on a dry basis. A hologram pattern was formed in the hologram layer by forming fine concaves and convexes by embossing using an original plate having a concave-convex pattern of interference fringes of a hologram.

| (Coating liquid for hologram layer) | |
| --- | --- |
| Acrylic resin | 40 parts |
| Melamine resin | 10 parts |
| Cyclohexane | 50 parts |
| Methyl ethyl ketone | 50 parts |

Further, a 500 angstrom-thick titanium oxide layer was formed as a transparent deposit by vacuum deposition on the hologram layer with the hologram pattern formed thereon. Thus, a hologram formation layer composed of the hologram layer and the transparent deposit was formed. The following coating liquid for a receptive layer was coated on the hologram formation layer, and the coating was dried to form a receptive layer at a coverage of 3.0 g/m$^2$ on a dry basis.

| (Coating liquid for receptive layer) | |
| --- | --- |
| Vinyl chloride-vinyl acetate copolymer | 40 parts |
| Acrylic silicone | 1.5 parts |
| Methyl ethyl ketone | 50 parts |
| Toluene | 50 parts |

Next, a 38 μm-thick polyethylene terephthalate film (Lumirror, manufactured by Toray Industries, Inc.) was provided as a sheet substrate. Register marks were formed on the sheet substrate at its positions as shown in FIG. 3 by gravure printing a register mark ink having the following composition at a coverage of 3 g/m$^2$ on a dry basis.

| (Register mark ink) | |
| --- | --- |
| Carbon black | 8.0 parts |
| Urethane resin (HMS-20, manufactured by Nippon Polyurethane Industry Co., Ltd.) | 5.0 parts |
| Methyl ethyl ketone | 38.5 parts |
| Toluene | 38.5 parts |

The transparent sheet provided with the hologram formation layer and the receptive layer was then dry laminated onto the sheet substrate provided with the register marks so that the transparent sheet on its side remote from the receptive layer faced the sheet substrate on its side having the register marks through a resin layer having the following composition (coverage 3 g/m$^2$ on a dry basis) (see FIG. 3 (4)). Further, in the laminate thus obtained, as shown in FIG. 3 (4), the transparent sheet 2 portion including the receptive layer 3 was subjected to half cutting 7 by pressing an upper die 14 provided with a cutter blade 16 toward a pedestal 15. Thus, a continuously wound intermediate transfer recording medium of Example 1 was prepared. The resin layer was separable from the transparent sheet.

| (Coating liquid for resin layer) (Easy-adhesion adhesive layer type) | |
|---|---|
| Acrylic resin latex (LX 874, manufactured by Nippon Zeon Co.) | 30 parts |
| Water | 35 parts |
| Isopropyl alcohol | 35 parts |

Example 2

A hologram formation layer and a receptive layer were provided on a transparent sheet in the same manner as in Example 1. Separately, a 38 μm-thick polyethylene terephthalate film (Lumirror, manufactured by Toray Industries, Inc.) was provided as a sheet substrate. A resin of low density polyethylene (LDPE) with 15% of titanium oxide being dispersed therein was extrusion coated on the sheet substrate to a thickness of 40 μm. Simultaneously with the extrusion, the transparent sheet with the receptive layer formed thereon was EC laminated onto the sheet substrate with the resin layer formed thereon so that the transparent sheet on its side remote from the receptive layer faced the LDPE layer provided on the sheet substrate. In this case, however, as shown in FIG. 3 (4), register marks were previously printed by register mark ink as used in Example 1 on the sheet substrate in its side where the LDPE layer was to be formed.

Further, in the laminate thus obtained, as shown in FIG. 3, the transparent sheet portion including the receptive layer was half cut by pressing an upper die provided with a cutter blade toward a pedestal. In addition, the whole portion except for the image forming portion was separated using the half cut as the boundary between the removal portion and the image forming portion remaining unremoved. Thus, a continuously wound intermediate transfer recording medium of Example 2 was prepared. This intermediate transfer recording medium was separable in its portion between the resin layer and the transparent sheet.

Comparative Example 1

A peel layer having the following composition was formed on a 25 μm-thick polyethylene terephthalate film (Lumirror, manufactured by Toray Industries, Inc.) at a coverage of 1 g/m² on a dry basis. The coating liquid for a receptive layer used in Example 1 was coated onto the peel layer to form a receptive layer at a coverage of 3 g/m² on a dry basis. Further, an adhesive layer having the following composition 1 was formed on the receptive layer at a coverage of 3 g/m² on a dry basis. Thus, a receptive layer transfer sheet was prepared. Separately, the coating liquid for a peel layer used in the preparation of the receptive layer transfer sheet was coated on a 25 μm-thick polyethylene terephthalate film (Lumirror, manufactured by Toray Industries, Inc.) to form a peel layer at a coverage of 1 g/m² on a dry basis. A protective layer having the following composition was formed on the peel layer at a coverage of 3 g/m² on a dry basis. An adhesive layer having the following composition 2 was then formed on the protective layer at a coverage of 3 g/m² on a dry basis. Thus, a protective layer transfer sheet was provided.

| (Coating liquid for peel layer) | |
|---|---|
| Polyvinyl alcohol resin (AH-17, manufactured by Nippon Synthetic Chemical Industry Co., Ltd.) | 100 parts |
| Water | 400 parts |

| (Composition of coating liquid 1 for adhesive layer) | |
|---|---|
| Polymethyl methacrylate resin (BR-106, manufactured by Mitsubishi Rayon Co., Ltd.) | 100 parts |
| Foaming agent (F-50, manufactured by Matsumoto Yushi Seiyaku Co., Ltd.) | 15 parts |
| Titanium oxide (TCA-888, manufactured by Tohchem Products Corporation) | 100 parts |
| Methyl ethyl ketone/toluene (weight ratio 1/1) | 300 parts |
| (Coating liquid for protective layer) | |
| Vinyl chloride-vinyl acetate copolymer (VYHD, manufactured by Union Carbide Corporation) | 100 parts |
| Methyl ethyl ketone/toluene (weight ratio = 1/1) | 400 parts |
| (Composition of coating liquid 2 for adhesive layer) | |
| Acrylic resin (BR-106, manufactured by Mitsubishi Rayon Co., Ltd.) | 100 parts |
| Methyl ethyl ketone/toluene (weight ratio = 1/1) | 300 parts |

An image was formed on the receptive layer in the samples provided in the examples and the comparative examples under the following conditions. For the sample provided in Comparative Example 1, a protective layer was further stacked on the image-receptive layer. A thermal transfer sheet (manufactured by Dai Nippon Printing Co., Ltd.), wherein three color transfer layers for yellow, magenta, and cyan as dye layers had been provided in a face serial manner, and each of the intermediate transfer recording media provided in the respective examples were put on top of each other so that each color transfer layer faced the receptive layer. Recording was then carried out by a thermal head of a thermal transfer printer from the backside of the thermal transfer sheet under conditions of head application voltage 12.0 V, pulse width 16 msec, printing cycle 33.3 msec, and dot density 6 dots/line. Thus, a full-color photograph-like image (a mirror image) of a face was formed on the receptive layer in the intermediate transfer recording medium.

Next, the intermediate transfer recording medium was put on top of a 600 μm-thick white PET-G sheet (PET-G, DIAFIX PG-W, manufactured by Mitsubishi Plastic Industries Ltd.) as an object so that the receptive layer with the image formed thereon faced the PET-G sheet. A thermal head and a platen roll were pressed against the assembly, and energy was applied to the image formed portion under conditions of 160 mJ/mm² and printing speed 33.3 msec/line (feed pitch 6 lines/mm) to adhere the image-receptive layer to the object. The sheet substrate was then separated. Thus, only the image formed portion could be re-transferred onto the object to form an image on the object. Further, for the sample of Example 1, at the time of the re-transfer, the transparent sheet portion was cut in such a state that the half cut served as the boundary between the removal portion and the portion remaining unremoved. As a result, the transparent sheet covered the surface of the image formed portion and thus functioned as an even firm protective layer, whereby fastness properties could be fully imparted to the image. Further, since the transparent sheet portion could be tidily cut at the half cut portion, the protective layer could be simply transferred onto the image with high accuracy. For the sample of Example 2, since the whole portion except for the image formed portion was previously separated using the half cut as the boundary between the removal portion and the portion remaining unremoved, at the time of the re-transfer, the transparent sheet portion was not cut and covered the surface of the image formed portion and thus functioned as an even firm protective layer, whereby fastness properties could be fully imparted to the image. Further, the protective layer could be transferred onto the image with better accuracy in a simpler manner.

The prints (re-transferred prints) prepared in Example 1 and Example 2 have a hologram image so as to cover the thermally transferred image. Therefore, alteration and forgery can be fully prevented.

In the sample provided in Comparative Example 1, the same white PET-G sheet as used in the examples was put as an object on top of the receptive layer transfer sheet, and the receptive layer was transferred onto the PET-G sheet by means of a thermal head. Next, the thermal transfer sheet as used in the recording of the intermediate transfer recording medium was put on top of the surface of the receptive layer, and a full-color photograph-like image (mirror image) of a face was formed on the receptive layer by means of a thermal head under conditions of head application voltage 12.0 V, pulse width 16 msec, printing cycles 33.3 msec, and dot density 6 dots/line. Further, a protective layer was transferred from the protective layer transfer sheet onto the image forming portion through the application of energy by means of the thermal head. Thus, an image was formed on the object. Next, the samples prepared in the examples and the comparative example were tested for Taber abrasion under conditions of CS-10 as a truck wheel, load on image 500 g, and 1400 cycles. In this case, the samples were visually inspected for disappearance of image. As a result, for both the samples of Example 1 and 2, the image did not disappear, whereas, for the sample of Comparative Example 1, the image disappeared.

As described above, according to the present invention, the process for producing an intermediate transfer recording medium comprising a sheet substrate provided with a resin layer and a transparent sheet provided with a receptive layer, the transparent sheet provided with the receptive layer having been stacked on the sheet substrate provided with the resin layer, the transparent sheet portion including the receptive layer having been half cut, a hologram formation layer being stacked on the transparent sheet, the resin layer being separable from the transparent sheet, comprises the steps of: providing an original sheet comprising a hologram formation layer stacked on a transparent sheet; forming a receptive layer by coating on the original sheet; applying the transparent sheet on its side remote from the receptive layer onto a sheet substrate, in which a register mark has been previously provided at a predetermined position for each screen unit, through a resin layer; and then reading the register marks to perform registration for half cutting and then to perform half cutting.

Thermally transferred images formed using the intermediate transfer recording medium thus obtained have various excellent fastness properties even under severe service conditions, and, by virtue of the adoption of half cutting, the protective layer (transparent sheet) can be transferred onto the image with high accuracy in a simple manner. Further, since a hologram image is provided on the transparent sheet, the alteration and forgery of the object with a thermal transferred image provided thereon can be fully prevented.

What is claimed is:

1. An intermediate transfer recording medium comprising: a sheet substrate provided with a resin layer; and a transparent sheet provided with a receptive layer, said transparent sheet provided with the receptive layer having been stacked on the sheet substrate provided with the resin layer so that the resin layer faces the transparent sheet, the transparent sheet portion including the receptive layer having been half cut, the resin layer being separable from the transparent sheet, a hologram formation layer being provided between the transparent sheet and the receptive layer.

2. The intermediate transfer recording medium according to claim 1, wherein the whole portion except for the image forming portion has been separated and removed using the half cut as the boundary between the image forming portion remaining unremoved and the removal portion.

3. The intermediate transfer recording medium according to claim 1, wherein a patch portion as the image forming portion, which has been separated by the half cutting, has a size smaller than the object in its whole area on which an image is to be transferred.

4. The intermediate transfer recording medium according to claim 1, wherein a patch portion as the image forming portion, which has been separated by the half cutting, has a partially removed portion relative to the object.

5. The intermediate transfer recording medium according to claim 1, wherein the total width of the intermediate transfer recording medium is larger than the width of the object in its face on which an image is to be transferred.

6. A process for producing an intermediate transfer recording medium comprising: a sheet substrate provided with a resin layer; and a transparent sheet provided with a receptive layer, said transparent sheet provided with the receptive layer having been stacked on the sheet substrate provided with the resin layer so that the resin layer faces the transparent sheet, the transparent sheet portion including the receptive layer having been half cut, a hologram formation layer being provided between the transparent sheet and the receptive layer, the resin layer being separable from the transparent sheet, said process comprising the steps of:

providing an original sheet comprising a hologram formation layer formed on a transparent sheet;

forming a receptive layer on the original sheet;

applying the transparent sheet on its side opposite to the receptive layer side, in which a register mark has been previously provided at a predetermined position for each screen unit, through a resin layer; and then reading the register marks to perform registration for half cutting and then to perform half cutting.

7. The process for producing an intermediate transfer recording medium according to claim 6, wherein, after the half cutting, the whole portion except for the image forming portion is separated and removed using the half cut as the boundary between the removal portion and the image forming portion remaining unremoved.

8. A method for image formation, comprising the steps of: providing the intermediate transfer recording medium according to any one of claims 1 to 5; forming a transfer image on the receptive layer; and then re-transferring only the portion with the image formed thereon onto an object to form an image on the object.

* * * * *